United States Patent [19]

Umemoto et al.

[11] Patent Number: 4,786,772

[45] Date of Patent: Nov. 22, 1988

[54] INDUCTION HEATING COIL FOR HEAT-TREATING METALLIC TUBES

[75] Inventors: Tadahiro Umemoto; Yasuhiro Tanaka; Chiyomitsu Fukazawa, all of Yokohama, Japan

[73] Assignee: Ishikawajima-Harima Heavy Industries Co., Ltd., Tokyo, Japan

[21] Appl. No.: 117,764

[22] Filed: Nov. 5, 1987

[30] Foreign Application Priority Data

Nov. 7, 1986 [JP] Japan ............... 61-170951[U]

[51] Int. Cl.[4] .................................... H05B 6/44
[52] U.S. Cl. ..................... 219/8.5; 219/10.491; 219/10.79; 266/129
[58] Field of Search .......... 219/8.5, 10.49 R, 10.43, 219/10.57, 10.79, 10.491; 266/127, 129, 121; 148/144, 143, 150, 152

[56] References Cited

U.S. PATENT DOCUMENTS

| | | | |
|---|---|---|---|
| 2,259,324 | 10/1941 | Robinson | 266/129 X |
| 2,277,223 | 3/1942 | Goodridge | 266/127 |
| 2,404,987 | 7/1946 | Rudd | 266/127 |
| 2,556,236 | 6/1951 | Strickland, Jr. | 266/127 X |
| 4,165,246 | 8/1979 | Reinke et al. | 219/8.5 X |
| 4,687,894 | 8/1987 | Koga et al. | 219/8.5 X |

*Primary Examiner*—Philip H. Leung
*Attorney, Agent, or Firm*—Cullen, Sloman, Cantor, Grauer, Scott & Rutherford

[57] ABSTRACT

An induction heating coil for heat-treating a metallic tube by producing compressive residual stress in the outer surface of the metallic tube. The induction heating coil is adapted to be spaced from and surround the metallic tube and comprises a plurality of donut-shaped hollow electric conductor members for inductively heating the metallic tube and a plurality of donut-shaped hollow water tubes including a large number of nozzles for spouting cooling water toward the metallic tube so as to form a uniform water film thereon with the nozzles being inclined with respect to the longitudinal direction of the metallic tube.

11 Claims, 4 Drawing Sheets

INDUCTION HEATING COIL FOR HEAT-TREATING METALLIC TUBES

FIELD OF THE INVENTION

This invention relates to inducting heating coils for heattreating metallic tubes, particularly those induction-heating coils that are capable of producing compressive residual stress in the outer surface of the metallic tubes that are heat-treated, thereby improving the resistance corrosion of the metallic tubes.

BACKGROUND ART

It is known that in metallic materials, for example, austenitic stainless steels that are often used in nuclear power generation plants and chemical plants, stress corrosion cracking likely occurs when tensile stress and corrosive substances exist at the same time. In the case where a pipeline is constructed by connecting a number of tubes (called "pipes" hereinafter) particularly by welding, the surfaces of the pipes at their welded joints are apt to be left in a state of tensile stress because of the thermal influence of welding.

Various techniques are known in the art for improving the stress state at the inner surface of a pipe. One is a method by which a compresive residual stress is given to the inner surface by induction-heating the pipe and simultaneously supplying cooling water through the pipe, thus creating a temperature difference across the wall of the pipe.

To improve the residual stress state in the outer surface of such pipes, however, no practical methods have been available because it is difficult to apply cooling water to the outer surface.

The principles of producing compressive residual stress in the outer surface of a pipe are known: by heating the pipe slowly from its outer surface, and on completion of heating, by cooling the surface, there is produced a compressive residual stress therein.

However, one important technical point here is that unless the cooling is conducted uniformly over the surface concerned, non-uniform distribution of compressive stress will result.

SUMMARY OF THE INVENTION

Thus, one objective of this invention is to provide an induction-heating coil that is capable of slowly heating a pipe from its outer surface, and then quickly and uniformly cooling the same surface, thereby improving its corrosion resistance.

Another objective of this invention is to provide an induction heating coil that is capable of uniformly leaving compressive residual stress in the outer surface of the metallic pipe independent of whether the pipe is isolated from or is an integral part of an existing pipeline, thereby improving the corrosion resistance of the treated pipe.

These objectives are achieved by means of an induction heating coil for heat treatment comprising:
- a plural number of electric conductors (called "heating coils" or "heating coil elements" hereinafter) for induction-heating the metallic tube to be heat-treated (called "the object pipe" hereinafter), each heating coil element capable of being assembled to form a ring surrounding the object pipe in the circumferential direction thereof, or free to be disassembled therefrom, so that an induction-heating coil can surround the object pipe in spaced relationship thereto and can be shiftably disposed in the longitudinal direction of the object pipe; and
- a plural number of cooling water tubes, each cooling water tube being capable of being assembled or disassembled to form a ring along a heating coil element, and each having a plurality of nozzles, obliquely facing the object pipe surface, to apply water jets to cool the induction-heated pipe surface.

Thus, as an induction heating coil equipped with a cooling water tube is formed surrounding the object pipe, and as the nozzles of the cooling water tube inject water jets obliquely with respect to the pipe surface, a water film that flows in a preselected direction is formed on the surface and is maintained as long as cooling water is applied from the nozzles.

DESCRIPTION OF THE PREFERRED EMBODIMENTS

The first preferred embodiment of the induction heating coil for heat-treating the metallic tubes of this invention will be described with the accompanying drawings of FIGS. 1, 2 and 3.

Figure 1:
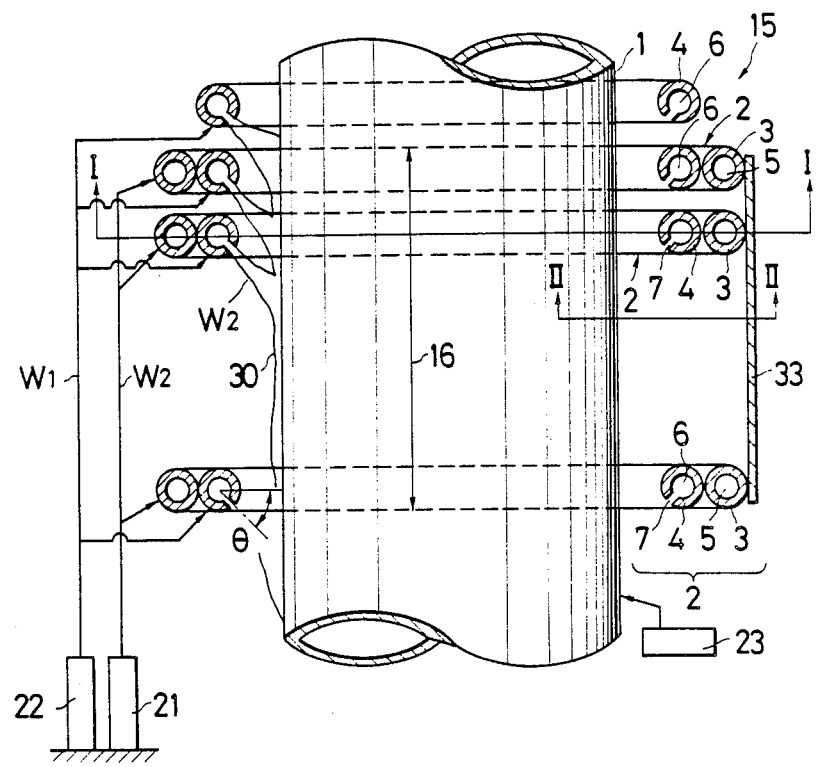
FIG. 1 is a partially sectioned frontal view of the induction heating coil of this invention, illustrating the first preferred embodiment.

In FIG. 1, an induction heating coil 15 is provided around the pipe 1 so as to surround the part 16 of the pipe 1 to be heat-treated (called "the object part" hereinafter). This induction heating coil 15 consists of hollow ring-shaped tubes of an electric conductor heating coil 3, made of an electric conducting material, such as copper or the like, and cooling water tubes 4 of a hollow ring form, which is made, like the heating coil 3, of an electrically conducting material, such as copper of the like, and is disposed along the inner periphery of the heating coil 3. In the first preferred embodiment shown in FIG. 1, furthermore, the cooling water tubes 4, except the topmost one, are each connected to the heating coil 3 along its periphery so as to form one integral ring body 2.

Figure 2:
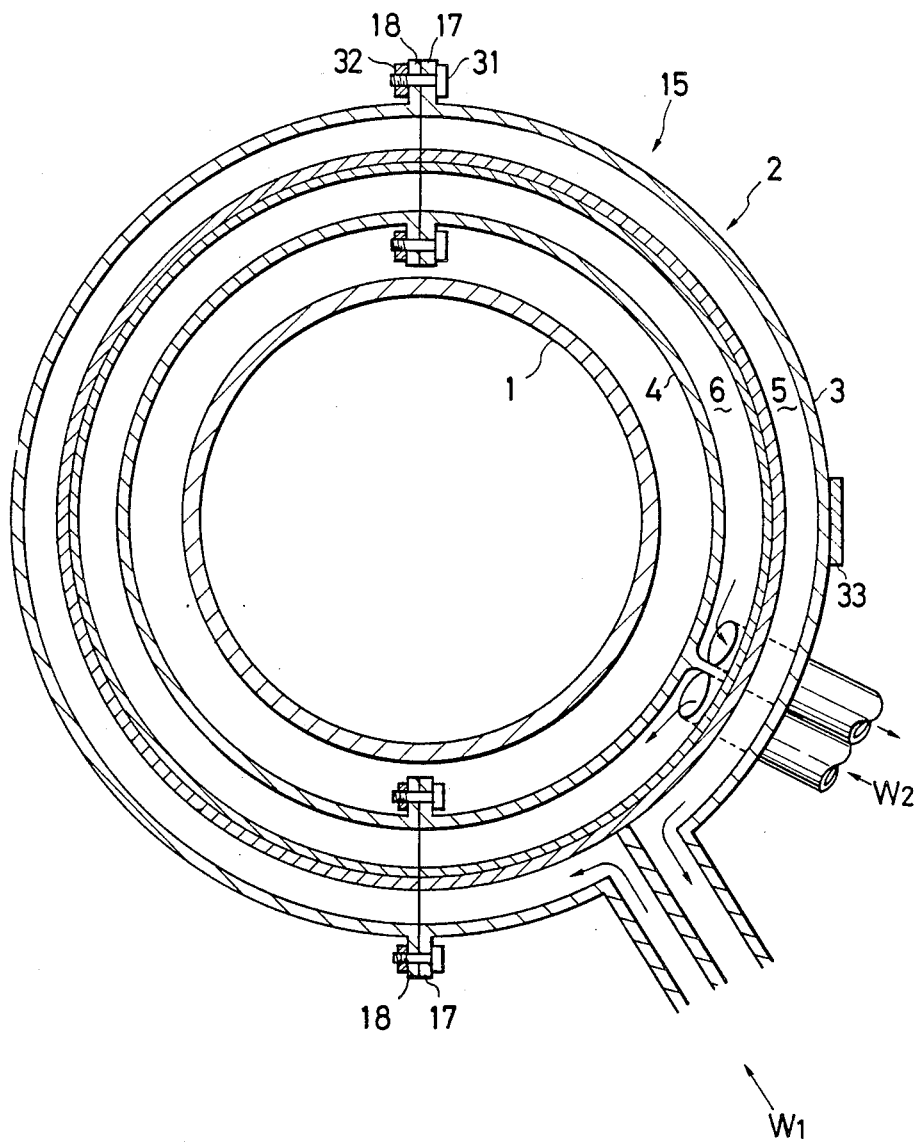
FIG. 2 is a cross-sectional view taken on line I—I of FIG. 1.

The ring bodies 2 are independent of each other, and as depicted in FIG. 2, each ring body 2 is formed by joining two divisible parts. At the divisible ends thereof, flanges 17 and 18 are provided, which are secured to each other by bolts 31 and nuts 32, to allow ready assembly of the two around the pipe 1. In this particular embodiment, the number of divisible parts is two. However, it may be three or more, if necessary, in order to accommodate the geometry or size of the pipe 1. The topmost water tube 4 of FIG. 1 is divisible and is similar in construction to the ring body 2. Thus, it is to be understood that disposition of coil 15 around part 16 of the pipe 1 is always possible, even when the pipe 1 is an integral part of a pipeline.

Referring now again to FIG. 1, a plurality of spaced apart ring bodies 2 are disposed along the longitudinal direction o the pipe 1, each being parallel to one another and having one water tube 4 at the top thereof. The rings 2 are independent of each other in terms of water passage, but are electrically connected to each other by the electric connector means 33. The cooling water tubes 4 function as induction heating coils when electric power is supplied since they are attached to the heating coils 3.

In the internal passages 6 and 5 respectively of the cooling water tube 4 and the heating coil 3, streams of cooling water $W_2$ and $W_1$ flow independent of one another as fed respectively by the water sources 22 and 21, which are held at a pressure of about 4 kgf/cm$^2$.

The cooling water is fed in a manner such that, into the passage 5 of the heating coil 3, cooling water $W_1$ is supplied while the electric power for induction heating is applied in a manner to prevent overheating of the heating coil 3, whereas into the passage 6 of the cooling water tube 4, cooling water $W_2$ is supplied so as to start the cooling of the object pipe 1 within not less than one second after completion of the heating.

Figure 3:
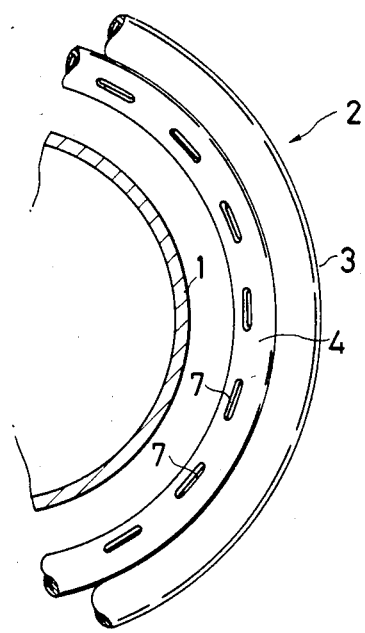
FIG. 3 is a sectional view taken on line II—II of FIG. 1.

On the inside wall of the cooling water tube 4 (i.e., the inner side along the radius of the ring body 23), there are provided from the passage 6 a large number of nozzles 7, which open, as shown in FIG. 3, in a row along the inner periphery of the ring body 2, so as to inject the cooling water jets toward the object pipe 1 in a direction inclined to the longitudinal axis thereof. Each nozzle 7 is elliptical in cross-section, and has its major axis aligned along the circumferential direction of the ring body 2 and a crosssectional area which is progressively reduced in the direction of flow of the cooling water stream 30 (or the cooling water film 30) that is formed on the outer surface of the object pipe 1. Thus, the cooling water film 30 is formed uniformly on the surface concerned by injecting the cooling water jets $W_2$ from these nozzles 7.

Here, the angle $\theta$ of the nozzle 7 relative to the object pipe 1 should preferably be about 30 degrees to 60 degrees. Also, the temperature of the outer surface of the object pipe 1 is measured by a temperature sensor 23.

Having constructed an induction heating coil 15 as described above by disposing the spaced apart ring bodies 2 around the object pipe 1 and by electrically connecting the ring bodies 2 with the electric connector 33, heating of the part 15 of the object pipe 1 is commenced by supplying high frequency power to the induction heating coil 15. The heating is terminated when the outer surface of the object pipe 1 has reached 500–550 degrees C; then forced cooling of the outer surface of object pipe 1 should be commenced within one second after completion of the heating by causing the nozzles 7 to inject the cooling water jets $W_2$.

The cooling water jets $W_2$ impinge upon the outer surface of the object pipe 1 as it spreads out, and, since the nozzles 7 are inclined by an angle $\theta$ with respect to the outer surface, a water film 30 is formed thereon by the impingement in one direction, namely that of the longitudinal direction of the object pipe 1. In this case, since the cooling water $W_2$ is continually fed from each nozzle 7, a continuous water film 30 (or a flow of water 30) is formed in the shape of a cylinder. Furthermore, since the nozzle 7 is formed with its opening progressively reduced in the direction of flow of water 30, the water film 30 thus formed on the outer surface of the object pipe 1 is uniform. This water film 30 is maintained by the cooling water jets $W_2$ from the nozzles 7.

By performing heating then cooling for the object pipe 1 as described heretofore, a temperature differential can be produced across the wall of the object pipe 1 as desired; as a result of this temperature differential, stress is produced in excess of the yield strength of the object pipe 1, thereby giving rise to compressive residual stress in the outer surface of the object pipe 1 upon cooling.

Although the shape of nozzle 7 has been shown as elliptical in the first embodiment described above, this shape may be circular or otherwise.

Figure 4:
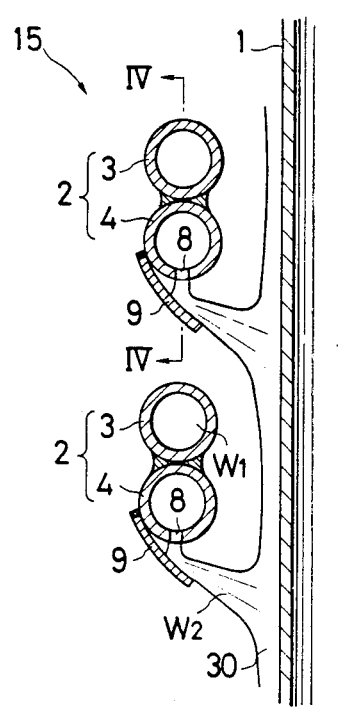
FIG. 4 is a vertical cross-sectional view of the induction heating coil of this invention, illustrating the second preferred embodiment.
Figure 5:
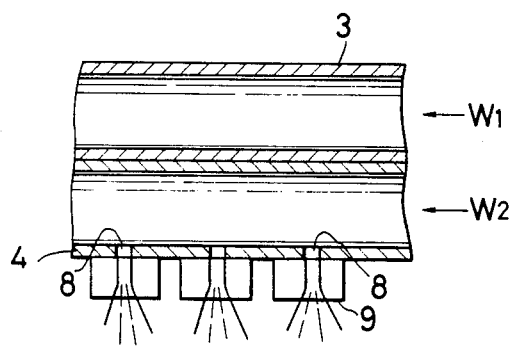
FIG. 5 is a sectional view taken on line IV—IV of FIG. 5.

The second preferred embodiment of the invention is illustrated in FIGS. 4 and 5, in which it is to be understood that, in this embodiment, the heating coil 3 and the cooling water tube 4 are disposed equidistant from the object pipe 1, by welding the cooling water tube 4 underneath of the heating coil 3 into a unified ring body 2. Here, the ring body 2 is divided into two or more parts along its circumference so that it can be freely assembled with the aid of flanges (not shown) into one integral ring body 2, or disassembled therefrom, as in the previous embodiment, thereby facilitating ready construction of the ring body 2 around an object pipe 1, whether it is an isolated entity of an integral part of an existing pipeline.

Into the passage 6 of the cooling water tube 4 and the passage 5 of the heating coil 3, cooling waters $W_2$ and $W_1$ are supplied individually from respective water sources (not shown). The cooling water $W_1$ supplied to the passage 5 prevents the heating coil 3 from overheating, whereas the cooling water $W_2$ supplied to the passage 6 cools the outer surface of the object pipe 1.

In the lowermost part of the cooling water pipe 4, there are provided, as shown in FIG. 5, a large number of nozzles 8 in a row along the circumference of the cooling water pipe 4. At the outer surface of the cooling water tube 4, there are provided guide vanes 9, which function to direct the water jet $W_2$ coming from the nozzle 8 toward the object pipe 1 at an angle of 30–60 degrees as well as to scatter it, such that the guide vane 9 will correspond to the nozzle 7 of the first embodiment in its action.

The streams of cooling water $W_2$, which have now been deflected and scattered, form the water film 30 (or flow of water 30) uniformly over the outer surface of the object pipe 1. It is to be appreciated here that, by changing the shape and attaching angle of the guide vane 9, the effect of cooling can be controlled.

Also, although the cooling water tube 4 and the heating coil 3 have been shown as forming a unified body by mutually connecting them in the preferred embodiment described above, they may be arranged so that they are separate.

Figure 6:
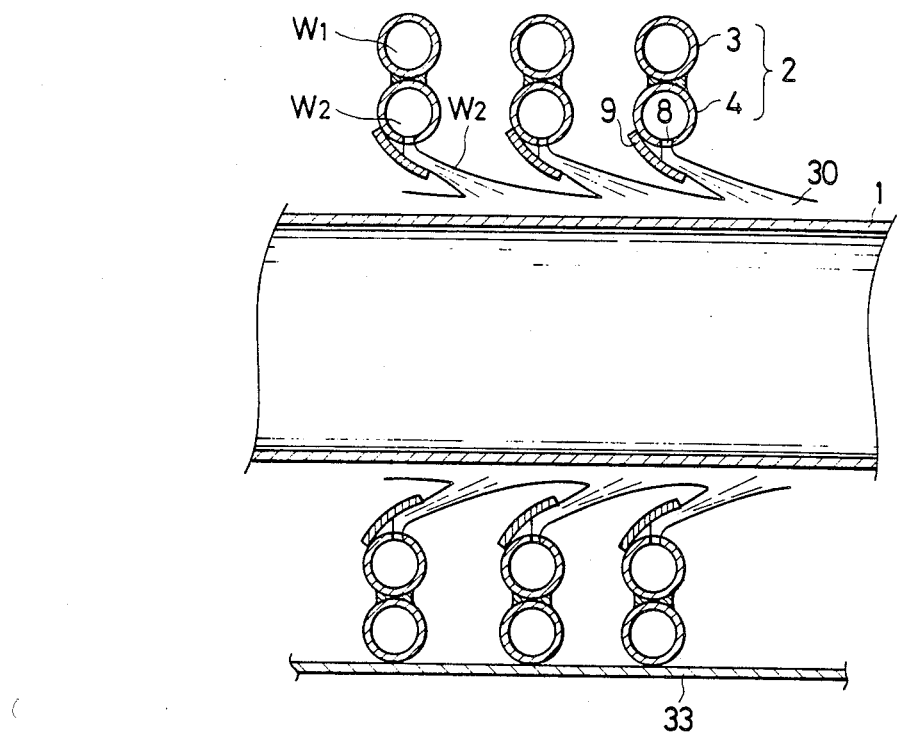
FIG. 6 is a cross-sectional view of the induction heating coil of this invention, illustrating the third preferred embodiment.

In FIG. 6, there is depicted a partially sectioned fragmentary schematic illustration of the induction heating coil 15 of a third embodiment of this invention. Each ring body 2, which is similar to the one described in the second embodiment, is disposed around the pipe 1. In this embodiment, however, the cooling water tube 4 is positioned inwardly with respect to the heating coil 3, with each tube 4 being attached to the corresponding heating coil 3 and the pipe 1 lying horizontally. The cooling water $W_2$, which is supplied from the cooling water tube 4 to be deflected and dispersed by the guide vanes 9, covers the object pipe 1, creating the water film 30 in the longitudinal direction of the pipe 1.

Thus, as described above, the use of the induction heating coil 15 of this invention to heat-treat metallic tubes readily allows slow heating of the outside of the object pipe 1 and subsequent formation of a uniform water film 30 on the outer surface of the object pipe 1 for uniform rapid cooling thereof, thereby creating a large temperature differential across the pipe wall and leaving compressive residual stress on the outer surface and the vicinity thereof.

Accordingly, the heat treatment of the outer surface of metallic tubes, which has in the past been considered to be difficult to perform, can be achieved by employing the induction heating coil 15 of this invention.

Also, the divisible construction of the induction heating coil 15 admits a free disposition thereof around an object pipe 1. In other words, the heat treatment afforded by the coil 15 can be used on both an isolated pipe and an integral part of an existing pipeline.

We claim:

1. An induction heating coil for heat-treating a metallic tube by leaving compressive residual stress in the outer surface of the tube, comprising:

a plurality of electrical conductors for inductively heating the metallic tube, said conductors being hollow and connectable with a source of cooling water to allow cooling water to be supplied through said conductors during induction heating of the metallic tube, each of said electrical conductors being constructed in the shape of a ring and dividable into at least two segments along its circumference to allow said segments to be assembled around the metallic tube into said ring, said conductors surrounding the metallic tube and being spaced apart from each other a predetermined distance in the longitudinal direction of the metallic tube when said conductors are assembled around the metallic tube; and a plurality of cooling water tubes for cooling the outer surface of the metallic tube after having been heat-treated by said electrical conductors, each cooling water tube being shaped in a ring and dividable along its circumference to allow assembly thereof into said ring, each cooling water tube being disposed along a corresponding one of said electrical conductors and having in its outer surface a plurality of nozzles for forming water jets which produce an essentially uniform film of water on the metallic tube so as to uniformly cool said surface, said nozzles being inclined with respect to the outer surface of the metallic tube.

2. An induction heating coil according to claim 1, wherein each of said cooling water tubes is disposed along the inner periphery of the corresponding electric conductor.

3. An induction heating coil according to claim 1, wherein at least one of said cooling water tubes is disposed between a pair of said electrical conductors.

4. An induction heating coil according to claim 1, including guide vanes on the outer periphery of said cooling water tubes for changing the direction of and dispersing the water jets from said nozzles.

5. An induction heating coil according to claim 1, wherein said electrical conductors and the corresponding cooling water tubes are attached to each other and form an integral body.

6. An induction heating coil according to claim 1, wherein said electrical conductors and said cooling water tubes are made of the same electrical conducting material.

7. An induction heating coil according to claim 6, wherein said electrical conducting material is copper.

8. An induction heating coil according to claim 1, wherein said water jet nozzles are inclined between 30 and 60 degrees relative to the longitudinal axis of the metallic tube.

9. An induction heating coil according to claim 1, wherein the cross-section of each of said water jet nozzles is elliptical in shape, with the major axis of said elliptical shape being aligned in the circumferential direction of the corresponding cooling water tube.

10. An induction heating coil according to claim 1, wherein the cross-section of each of said water jet nozzles is circular in shape.

11. An induction heating coil according to claim 1, wherein the geometry of each of said nozzles is gradually tapered in the longitudinal direction of the flow of said water film.

* * * * *